Oct. 4, 1927.
W. A. BROWNE
1,643,976
AUTOMATIC TRAIN STOPPING AND SPEED CONTROLLING APPARATUS
Filed Nov. 1, 1922
6 Sheets-Sheet 2
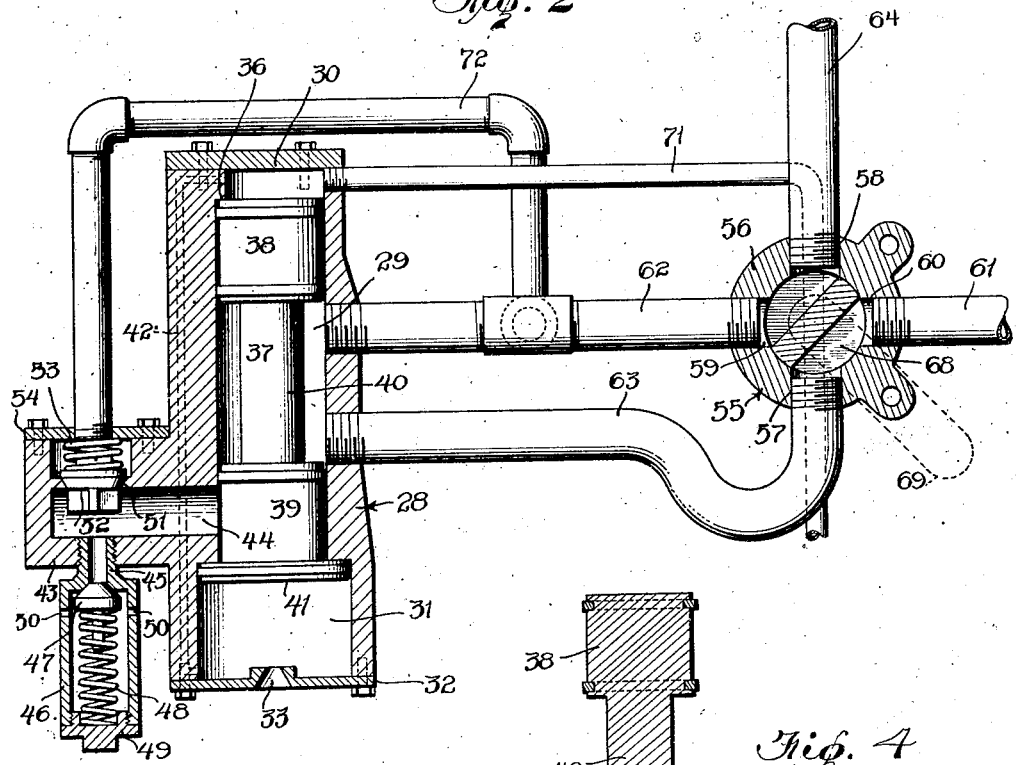
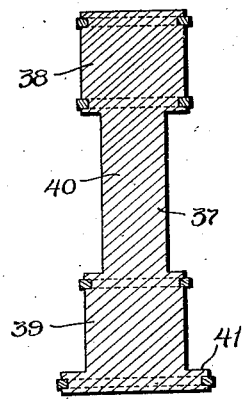
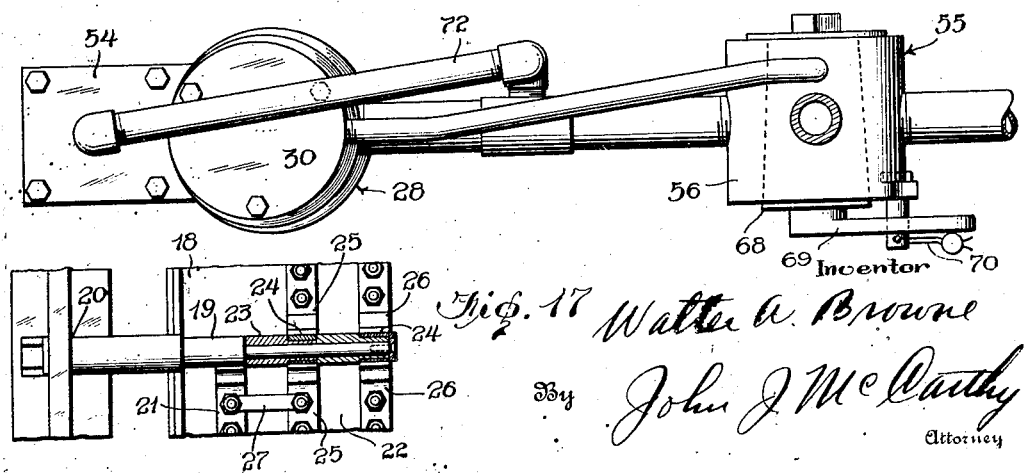

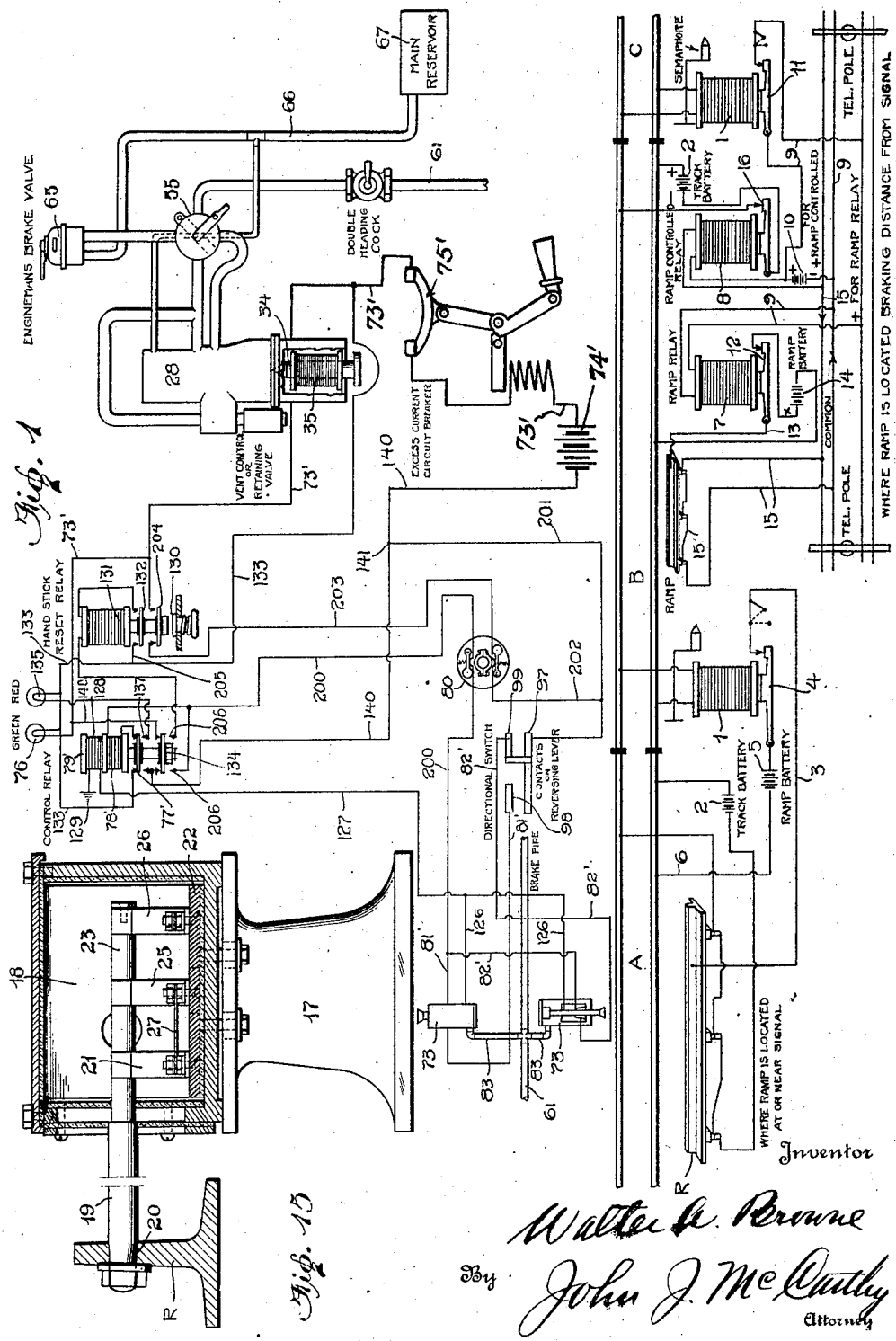

Oct. 4, 1927.  W. A. BROWNE  1,643,976
AUTOMATIC TRAIN STOPPING AND SPEED CONTROLLING APPARATUS
Filed Nov. 1, 1922   6 Sheets-Sheet 3
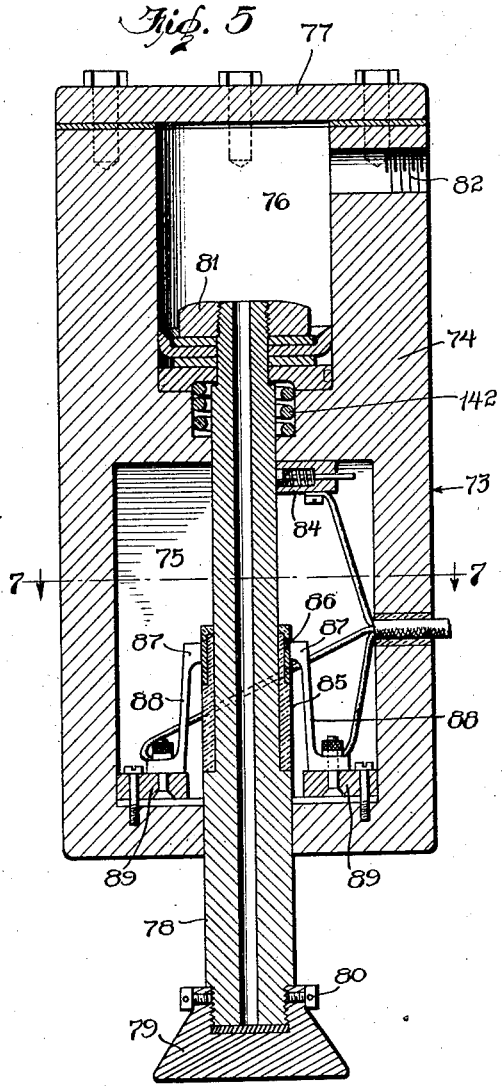
Fig. 5
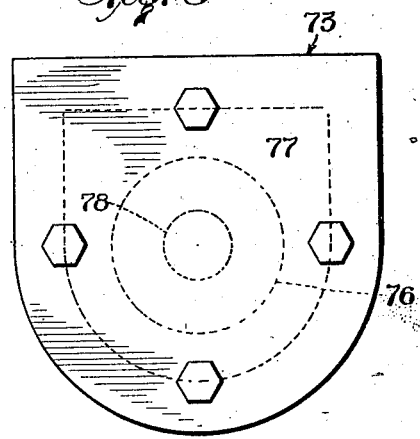
Fig. 6
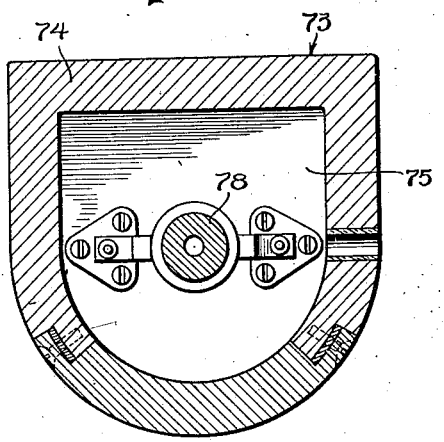
Fig. 7
Fig. 16
Inventor
Walter A. Browne
By John J. McCarthy
Attorney Oct. 4, 1927.
W. A. BROWNE
1,643,976
AUTOMATIC TRAIN STOPPING AND SPEED CONTROLLING APPARATUS
Filed Nov. 1, 1922   6 Sheets-Sheet 4
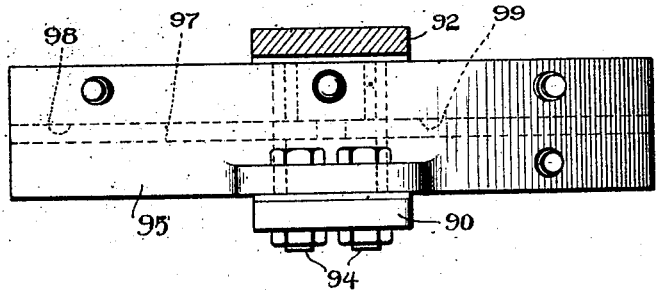
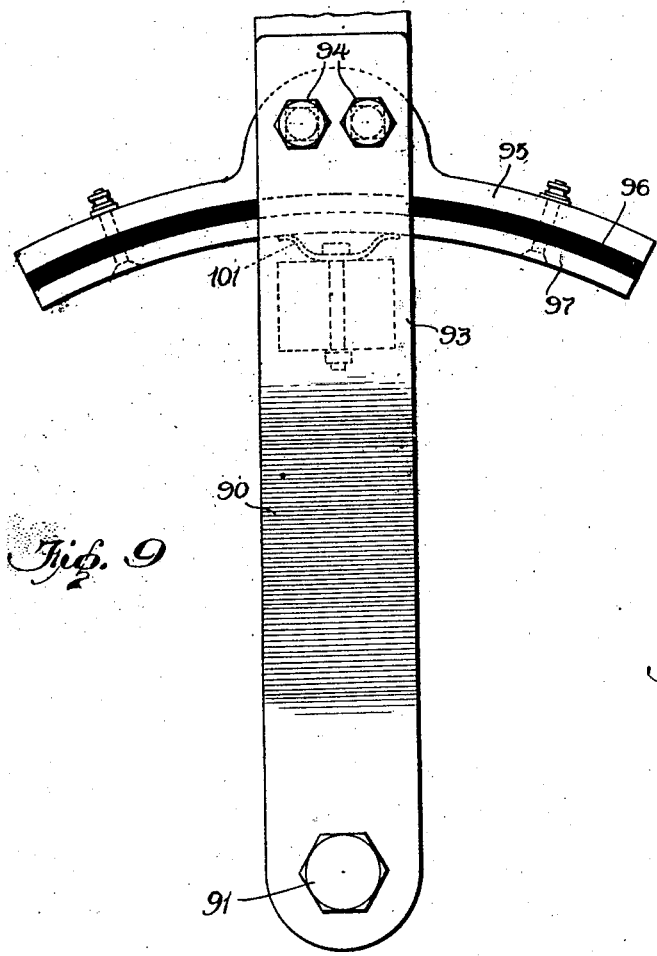
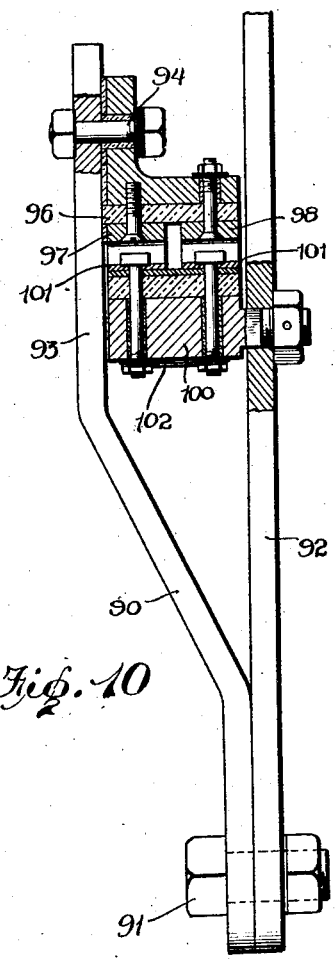
Inventor
Walter A. Browne
By John J. McCarthy
Attorney

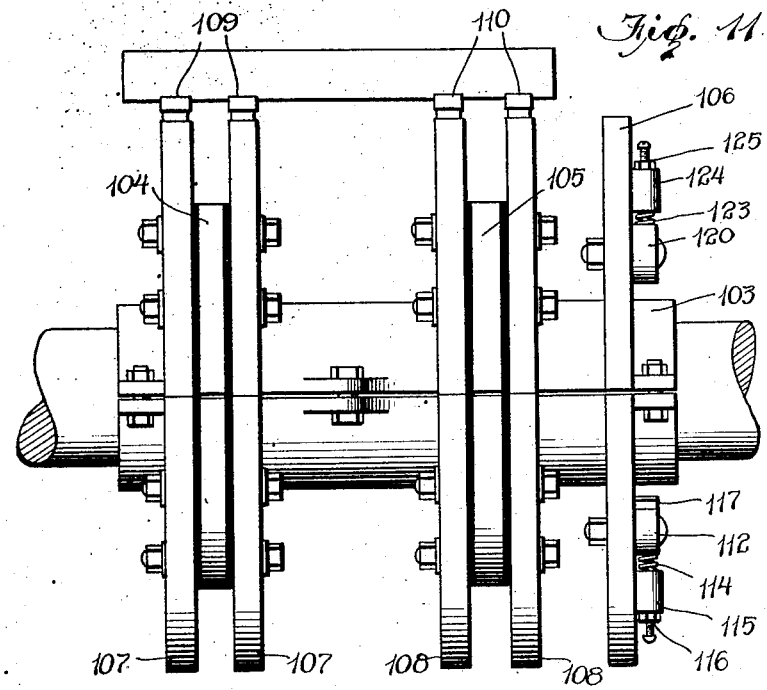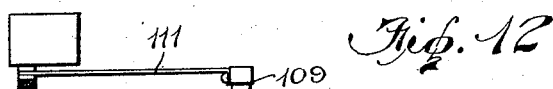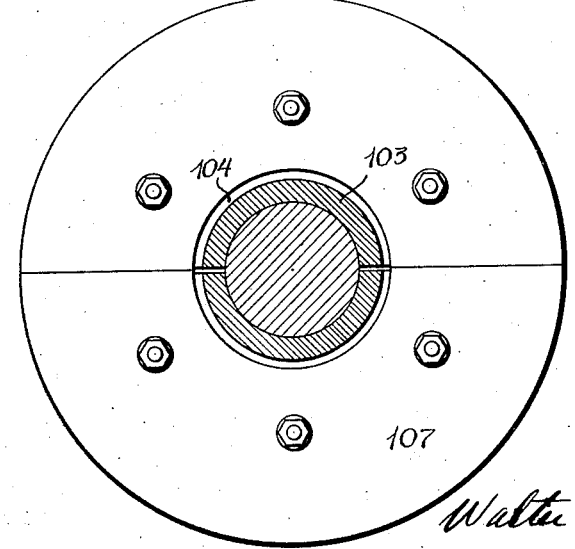

Oct. 4, 1927.

W. A. BROWNE 1,643,976

AUTOMATIC TRAIN STOPPING AND SPEED CONTROLLING APPARATUS

Filed Nov. 1, 1922  6 Sheets-Sheet 6

Inventor
Walter A. Browne
By John J. McCarthy
Attorney

Patented Oct. 4, 1927.

1,643,976

UNITED STATES PATENT OFFICE.

WALTER A. BROWNE, OF WASHINGTON, DISTRICT OF COLUMBIA, ASSIGNOR TO WARTHEN TRAIN CONTROL CORPORATION, OF WASHINGTON, DISTRICT OF COLUMBIA, A CORPORATION OF DELAWARE.

AUTOMATIC TRAIN-STOPPING AND SPEED-CONTROLLING APPARATUS.

Application filed November 1, 1922. Serial No. 598,285.

In carrying out the present invention it is my purpose to improve and simplify the general construction of automatic stopping and speed controlling apparatus for railway trains, and my present invention is in the nature of an improvement upon the system and apparatus for stopping and controlling the speed of trains covered by Patents Nos. 1,090,357, issued March 17, 1914; 1,090,358, issued March 17, 1914; 1,090,359, issued March 17, 1914; 1,090,360, issued March 17, 1914; 1,090,361, issued March 17, 1914; 1,090,362, issued March 17, 1914; 1,090,363, issued March 17, 1914; 1,090,806, issued March 17, 1914; 1,090,807, issued March 17, 1914 and 870,145, issued November 5, 1907, issued to Harry J. Warthen, deceased, and now owned and controlled by the Warthen Train Control Corporation.

It is also my purpose to provide a system for controlling the speed of trains under certain conditions and for automatically bringing such trains to a standstill under certain other conditions, which may be installed and maintained economically and which will operate efficiently under all conditions.

With the above recited objects in view, and others of a similar nature, the invention resides in the construction, combination and arrangement of parts set forth in and falling within the scope of the appended claims.

In the accompanying drawings:

Figure 1 is a diagrammatic view of our entire train stopping and speed controlling system.

Figure 2 is an enlarged sectional view through the automatic valve for effecting an application of the brakes.

Figure 3 is a top plan view of the same.

Figure 4 is a detail sectional view of the piston employed in the automatic valve.

Figure 5 is an enlarged vertical sectional view through the car carried shoe and the circuit controlling devices connected to such shoe.

Figure 6 is a top plan view of the same.

Figure 7 is a horizontal sectional view on the line 7—7 of Figure 5.

Figure 8 is a top plan view of the reversing switch or directional switch.

Figure 9 is a view in side elevation of the same.

Figure 10 is a vertical sectional view therethrough, parts being shown in elevation.

Figure 11 is a view in end elevation or the minimum and maximum speed governors.

Figure 12 is a vertical sectional view through Figure 11.

Figure 15 is a sectional view through the safety contacts for the ramp rail.

Figure 16 is a vertical sectional view through the ramp rail safety contacts.

Figure 17 is a horizontal sectional view through the same.

Figure 13:
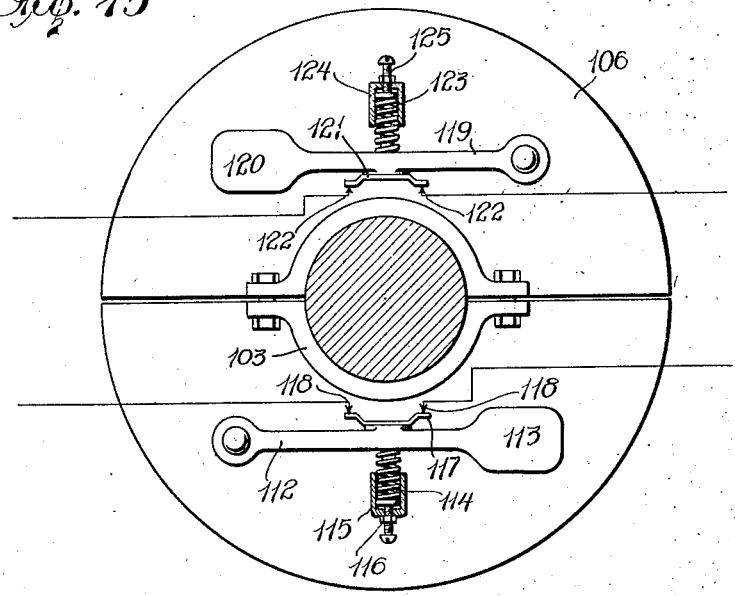
Figure 13 is an end view of Figure 11.

In practice, my improved train stopping and speed controlling system may be used in connection with the usual automatic block signalling system, and in the present instance I have shown the system as so used, and therefore the trackway is divided into blocks, as shown at A, B and C. On one end of each block is the usual track relay 1 that is connected in circuit with the track battery 2 through the rails of the block. This track relay, in the present instance, is normally energized by the track battery, and when the block is occupied the track battery is short circuited so as to deenergize the relay, thereby permitting the apparatus under the control of the relay to be actuated to indicate a danger condition. Located alongside of the track rails in each block is a ramp rail R, and each ramp rail is under the control of the track relay of the preceding block and is connected in a circuit that is energized as long as the track relay is energized and that is open when the track relay is deenergized, thereby maintaining the controlled ramp in the same condition as the relay of the advance block. At the right hand side of Figure 1 of the drawings below the track rails I have shown one form of controlling means between the track relay and the controlled ramp rail R, while at the left hand side of Figure 1 below the track rails I have shown another form of control between the track relay and the ramp rail.

Referring to the structure at the left of Figure 1, the safety contacts for the ramp rail R, which are fully described in detail hereafter, are connected in series in the battery circuit, so that in the event of displacement of the ramp rail the track circuit will be broken, so as to deenergize the track relay. The ramp rail itself is connected in a holding circuit, which, in the present instance, includes a conductor 3 that is terminally connected at one end with the ramp R and at its other end with a fixed contact that cooperates with a movable contact carried by an armature 4 that is under the control of the track relay of the advance block. The armature 4 is connected to one side of what I term a ramp battery 5 and to the other side of the ramp battery 5 is connected by means of a conductor 6 with one line of rails of the block in which the particular ramp rail R is located. Thus, as long as the circuit is maintained by the track relay by means of the armature 4, one side of the battery 5 is connected with the track rails of the block and the other side is connected with the ramp rail R, so that the apparatus carried by the car may be maintained energized when the car or train is in the particular block and the shoe carried thereby in engagement with the ramp rail R, as is more fully described hereinafter. When, however, the armature 4 is released, incident to the deenergization of the track relay, the holding circuit is broken at the armature and the car carried apparatus deenergized, so as to function.

The apparatus illustrated at the right hand side of Figure 1 of the drawings below the track rails embodies what I term a ramp relay 7 and a ramp controlled relay 8 located in each block. The ramp relay 7 in the present instance is under the control of the track relay 1 of the preceding or advance block, and this ramp relay is connected in a circuit 9 that includes a battery 10 and an armature switch 11 under the control of the track relay. As long as the track relay is energized, current flows from the battery 10 through the armature switch 11 and the relay 7, thereby maintaining the latter energized. This relay 7 controls an armature switch 12 that is connected in the holding circuit, the track portion of which is indicated at 13, and this portion 13 of the holding circuit includes a battery 14 and is terminally connected with the ramp rail R and the ramp relay armature of the particular block in which the ramp rail R is located. Thus, an electrical potential exists between the track rail and the ramp rail as long as the armature switch 12 is maintained closed by the ramp relay 7. The ramp controlled relay 8 is connected in a circuit 15 that includes the battery 10, and the safety contacts of the ramp rail R, and this ramp controlled relay 8 that is connected in circuit 15 that includes the battery 10 and the safety contacts for the ramp rail R, controls an armature switch 16 which is connected in series with the circuit of the track battery 2 of the particular block in which the ramp rail is located. As long as the ramp rail R is intact and properly positioned, the circuit 15 of the ramp controlled relay 8 is closed, thereby maintaining the switch 16 closed, so that the track battery circuit is closed at the switch 16. Should, however, the ramp rail become displaced, the circuit 15 will be broken, thereby deenergizing the ramp controlled relay 8 so that the switch 16 may open, and thus break the track battery circuit, thereby deenergizing the track relay of the particular block, so that the ramp rail under the control of such track relay will be disconnected from its battery. As long as the circuit 9 under the control of the track relay of the advance block is closed at the swich 11, the battery 10 maintains the ramp relay 7 energized, so that the ramp rail R is connected with the battery 14. When, however, the track relay of the advance block is deenergized, the circuit of the ramp relay 7 is broken, thereby breaking the electrical connection between the battery 14 and the ramp rail R, so as to deenergize the ramp rail.

In the present instance, each ramp rail R is mounted upon a suitable foundation. Arranged alongside of the track and mounted upon an independent foundation to one side of the foundation of the ramp rail is a pedestal 17. Upon the upper end of the pedestal 17 is a suitably constructed housing 18. Arranged within the housing 18 is a horizontal rod 19 that extends through one end of the housing and is connected with the ramp rail R, as at 20. Bearing upon the rod 19 adjacent to the end of the housing 18 through which the rod projects is the upper end of a contact finger 21 fastened to a slab 22 of insulating material that is secured to the bottom wall of the housing. The remaining portion of the rod 19 between the contact finger 21 and the inner end of the rod is covered by a sleeve of insulating material 23, and encircling the sleeve of insulating material 23 and insulated from each other by such sleeve and from the rod are conductor rings 24. Bearing against the conductor rings 24 are pairs of contact fingers 25 and 26 fastened to the slab 22. The contact fingers 26 are connected in the circuit of the track battery, while the contact fingers 25 are connected in circuit with the ramp battery and one of the contacts 25 is also electrically connected with the contact finger 21 by a bridging strip 27. By means of this arrangement of contact fingers and the circuit connections it will be seen that as long as the ramp rail R is in normal position, the circuits are properly maintained, whereas in the event of a displacement of the ramp rail, either laterally, vertically or longitudinally, the circuit connections at the contact fingers are broken, thereby deenergizing the track relay and the controlled ramp relay. This structure constitutes the safety contacts for the ramp rails.

The car carried mechanism embodies, among other features, a means for bringing about an application of the brakes automatically when the ramp rail is disconnected from the source of current and the train enters the block of such ramp rail. In the present instance, this means comprises a casing 28 formed with a longitudinal bore 29 that is closed at one end of the casing by an end plate 30 and that communicates at its other end with a circumferentially enlarged chamber 31 formed in the casing 28. The outer end of the chamber 31 is closed by an end plate 32 and this end plate 32 is formed with a vent port 33 that is normally closed by a valve 34 under the control of an electro-responsive device 35 and normally held in position to close the port 33 as long as the electro-responsive device is energized. A short distance from the end plate 30 the bore 29 is formed with a shoulder 36. Slidably mounted within the bore 29 is a piston valve 37 comprising heads 38 and 39 connected to each other by means of a stem 40 of less diameter than the heads 38 and 39. The head 39 is formed at its outer end with an enlarged piston head 41. This piston head 41 fits the chamber 31, while the heads 38 and 39 fit the bore 29 and normally the head 38 engages against the shoulder 36, while the piston head 41 engages against the inner end of the chamber 31, as clearly shown in Figure 2 of the drawings. The casing 28 is also formed with a passage 42 that establishes communication between the chamber 31 and the space between the end plate 30 and the adjacent end of the piston head 38, so that the pressure on the head 38 and the piston head 41 will be such as to hold the piston valve in normal position as long as the port 33 is closed. Formed on the casing 28 adjacent to the normal position of the head 39 is a lateral extension 43 that is formed with a passage 44, the outer end of which is closed and the inner end of which is normally closed by the head 39. Threaded into the extension 43 and in communication with the passage 44 is a nipple 45 formed on one end of a housing 46. Seated against the end of the passage in the nipple 45 that opens into the housing 46 is a valve 47 that is normally held against its seat by a coiled expansion spring 48, one end of which engages the valve 47, while the other end engages the plug 49 threaded into the outer end of the housing 46. The housing 46 is also formed with vent openings 50 by means of which communication may be established between the passage 44 and the atmosphere when the valve 47 is forced away from its seat against the action of the spring 48. The passage 44 at a point diametrically opposite to the nipple 45 is formed with an opening 51, and engaging the wall of the opening 51 is a valve 52 normally held seated by a spring 53 that is interposed between the valve 52 and a plate 54 that is bolted or otherwise secured to the casing 43 to close the compartment of the valve 52 and spring 53.

55 designates a two-way cut-out cock, the casing 56 of which is formed with diametrically opposed ports 57 and 58 and with diametrically opposed ports 59 and 60 arranged at right angles to the ports 57 and 58. The port 60 is connected with the train line brake pipe 61, while the port 59 is connected by means of a pipe 62 with the bore 29 between the piston heads 38 and 39 when the piston valve is in normal position, as in Figure 2 of the drawing. The port 57 is also connected by a pipe 63 with the bore 29 between the heads 38 and 39, and is always in open communication with such bore. The port 58 is connected by a pipe 64 with the engineer's brake valve 65 which, in turn, is connected to the pipe line 66 with a main air reservoir 67. The plug of the cut-out cock is indicated at 68 and in the present instance is equipped at one end with a handle 69 and is movable to a position to establish communication between the ports 60 and 57 and establish communication between the ports 58 and 59. This is the normal position of the plug. The plug is also movable to establish communication between the ports 60 and 58 and to break the communication between the ports first mentioned. The handle 69 of the plug is preferably sealed in either of its positions by suitable sealing means 70, as shown in Figure 3 of the drawings.

In the normal position of the cut-out cock, the air pressure flows from the main reservoir 67 through the pipe 66, engineer's brake valve 65, pipe 64, ports 58 and 59, pipe 62, bore 29 between the piston heads 38 and 39, pipe 63 and ports 57 and 60 to the train line, thereby giving the engineer control of the brake pressure in the train line. Tapped into the pipe 66 is a pipe line 71 that is connected with the casing 28 between the head 38 and the end plate 30, so that the air pressure may flow through the by-paths 42 into the chamber 31, thereby maintaining the balance valve in normal position as long as the port 33 is closed. When, however, the port 33 is open, the pressure in the chamber 31 is released, thereby permitting the pressure on the piston head 38 to slide the piston valve out of normal position, so that the head 38 may block the pipe 62 and the head 39 uncover the passage 44. Thus, the engineer's brake valve is rendered useless for service braking purposes and the train line air pressure escapes through the pipe 63, passage 44 and the nipple 45 past the valve 47 to the atmosphere by way of the vents 50, the train line pressure unseating the valve 47 against the action of the spring 48. Thus, a service application of the brakes is brought about. Tapped into the pipe 62 is one end of a branch pipe 72, the other end of which is tapped into the plate 54, as clearly shown in Figure 2 of the drawings. Thus, should the engineer manipulate his brake valve to effect a further reduction of pressure in the pipe line 61, the air pressure in pipe 72 and on the upper side of valve 52 will be released, thereby permitting such valve to be blown open against the action of spring 53 by the pressure in the passage 44, so as to bring about an emergency application of the brakes and prevent the release of the brakes.

Mounted upon each side of the locomotive, or tender according to which is found the more practical, is a ramp rail controlled circuit making and breaking device 73, shown in detail in Figures 5, 6 and 7 of the drawings. In the present instance each device 73 comprises a vertical housing 74 formed with a compartment 75 in its lower end and a chamber 76 in its upper end, the latter being closed by a cap plate 77 bolted or otherwise fastened in place. Extending through the compartment 75 is a hollow rod 78 coaxial with the chamber 76 and having its upper end extending into the chamber and its lower end projecting through the bottom of the compartment 75. Detachably connected to the lower end of said rod and closing such end is a shoe 79 that is equipped with set screws 80 by which it may be locked in position and through which a seal may be passed. The upper end of the rod 78 is in open communication with the chamber 76 and is equipped with a piston head 81, while formed in the side wall of the chamber 76 above the piston head is a port 82 that is connected by a branch pipe 83 with the train line air pipe 61, so that as long as the pressure is maintained in the train line the piston head 81 and rod 78 will be held in lowered positions or normal positions, as in Figure 5. Fastened to the top wall of the compartment 75 is a contactor 84 that bears against the rod 78 and is connected in the car carried portion of the holding circuit as is presently described, while encircling the rod 78 at the lower end of the compartment 75 is an insulating sleeve 85 that carries a current carrying ring 86. Bearing upon this ring 86 at diametrically opposite points are contact lugs 87 formed on the upper ends of current carrying arms 88 fastened to and insulated from the bottom of the compartment 75, as at 89. These arms 88 are connected in a main circuit as is more fully described hereinafter.

The car carried mechanism also includes a reversing switch or directional switch, one illustration of which is shown in Figures 8, 9 and 10 of the drawings. This reversing switch is preferably, although not necessarily, connected to the reversing lever of the valve motion, and, in the present embodiment of my invention, includes an arm 90 fixed at its lower end to the pivot bolt 91 of the valve motion reversing lever 92 and having its upper end offset outwardly from the lever 92 as at 93, so as to be spaced apart therefrom as shown in Figure 10 of the drawings. Bolted as at 94, or otherwise fastened to the upper end 93 of the arm 90 and insulated from such arm is a curved plate 95 struck on an arc having the pivot bolt 91 as its center, and fastened to the under side of the plate 95 is a strip of insulation 96. To the under side of the strip of insulation 96 is fastened a continuous conductor strip 97 and conductor strip sections 98 and 99, the latter lying end to end and parallel with the strip 97 and having their adjacent ends insulated from each other. Fastened to the lever 92 at the side thereof confronting the arm 90 is a block 100 arranged below the conductor strips 97, 98 and 99. Fastened to the top of this block and insulated therefrom and from each other are contactors 101, one of which has rubbing contact with the strip 97, while the other has similar contact with the strips 98 and 99. These contactors 101 are connected together electrically by a bridging strip 102. Thus, when the reversing lever 92 of the valve motion is in one position, the contactors 101 electrically connect the strips 97 and 99, while when the lever 92 is moved to reverse position this connection is broken and a connection established between the strips 97 and 98.

Figure 14:
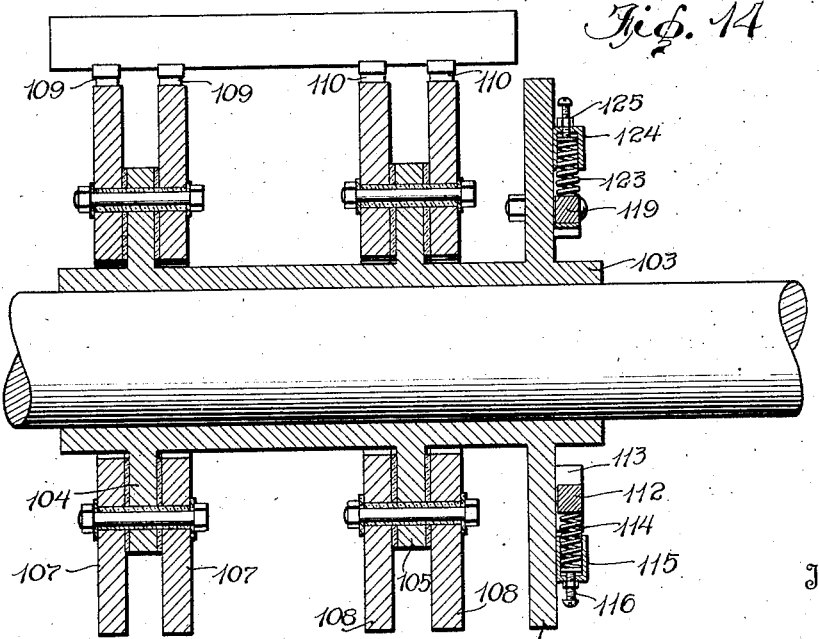
Figure 14 is a vertical longitudinal sectional view through the governors shown in Figure 11.

In the practice of my invention I also employ speed governing mechanism, which, in the present example of my system, embraces a minimum speed governor and a maximum speed governor. In this instance the speed governing mechanism, which is shown in detail in Figures 11, 12, 13 and 14, comprises a sleeve like casting 103, formed of complementary sections bolted together around one of the axles of the locomotive or tender, as the case may be, and provided with circular flanges 104, 105, of substantially the same diameter and a circular flange 106 of a diameter greater than that of the flanges 104, 105. Bolted to the flanges 104 and 105 are pairs of disks 107, and 108, respectively, that are insulated from the flanges and from the disks of each pair are also insulated from each other, as clearly shown in the drawings. Bearing upon the disks 107 and 108 respectively at the peripheries thereof are pairs of contact brushes 109 and 110 that are carried by spring arms 111 suitably fastened to the car body or running gear, so that the brushes may maintain a rubbing contact with the disks in the rotation of the latter incident to the revolution of the axle to which the casting 103 is fixed. Pivoted at one end to one face of the disk 106 is a lever 112 that has its other end weighted as at 113 so that the lever may respond to centrifugal force in the rotation of the disk 106. The lever is held in normal position by a spring 114 which is seated in a cup 115 carried by the disk and bears against the lever, an adjustment 116 being provided so that the tension of the spring may be varied. This lever 112 carries a contact strip 117 that normally engages contacts 118 carried by the adjacent face of the disk. A second lever 119 is also pivoted at one end to one face of the disk 106 at a point diametrically opposite the pivot point of the lever 112 and has its other end weighted, as at 120, so as to respond to centrifugal force. This lever 119 carries a bridging contact strip 121 that normally engages contacts 122 carried by the adjacent face of the disk and the lever is held normally against the action of centrifugal force by a spring 123 seated in a cup 124 and equipped with tension adjusting means 125. The contacts 118 are electrically connected with the disks respectively of the pair 108, while the contacts 122 are likewise connected with the disks of the pair 107. The disks 107 and the lever 119 and associated parts constitute the high speed governor, while the disks 108 and lever 112 and associated parts form the low speed governor, the spring of the high speed governor being of heavier gauge and greater tension than that of the minimum speed governor. Thus, when the train or car is travelling below the minimum speed at which the low speed governor is set, the levers 112 and 119 of both governors are in normal positions and the controlled circuits closed, while when the car is moving above the minimum speed but below the maximum, the low speed governor opens its controlled circuit, incident to the lever 112 swinging outwardly under the action of centrifugal force against the tension of the spring 114. When the speed of the car exceeds the maximum for which the high speed governor is set, then the lever 112 swings outwardly against the action of centrifugal force and opens the controlled circuit at the contacts 112.

Having described the detail construction and to some extent the operation of the brake applying apparatus, the ramp rail controlled circuit making and breaking devices, the reversing switch or directional switch and the speed govering mechanism, I will now proceed to describe the circuit connections between these car carried elements and the necessary devices for controlling them, so that when a dangerous condition exists ahead of the moving train or car, the latter may be brought to a stop automatically, or the engineer permitted to retain control of his train, provided that the speed is below that at which the low speed governor is set to operate.

The electro-responsive device 35 is connected in a main circuit that is normally closed and includes a battery or other source of electric energy 74' and a conductor 73' that extends from one side of the battery 74' through an overload circuit breaker 75' and the device 35; a conductor 140 that extends through a switch 134 and an additional contactor on the overload circuit breaker 75' and is terminally connected to the other side of the battery 74'. This switch 134 is, in the present instance, connected to the plunger or core of a double coil solenoid 79', which solenoid includes a lower coil 78' and an upper coil 128, the lower coil 78' being normally energized in a manner to be presently described. This lower coil 78' is connected in a circuit that includes the battery 74', a portion of the conductor 73' between the device 35 and the overload circuit breaker 75', a conductor 133, a switch 77', the coil 78' and a conductor 200 that extends through the contacts of the high speed governor 80 and is terminally connected to branch wires 81', 82' that extend respectively through the contact arms 88 of the ramp rail controlled circuit making and breaking device 73. These branch conductors 81' and 82' are connected respectively to the conductor strip section 98 or 99 of the reversing switch and the current flows from one or the other of the strips 98 and 99, depending upon which one is connected to the continuous strip 97, through a conductor 201 which is terminally connected to the conductor 140, as at 141, thence back to the other side of the battery 74'. Thus, it will be seen that the lower coil 78' of the double coil solenoid 79'', the excess speed governor 80, the active ramp rail controlled circuit making and breaking device and the reversing switch are connected in series with one another and in multiple with the main circuit, while the switch 77' is connected in series with the coil 78', thereby maintaining this multiple path closed as long as the lower coil 78' is energized, and the train travelling within the speed at which the maximum speed governor is set. The upper coil 128 of the double coil solenoid 79' has one terminal grounded, as at 129, while the other terminal is connected by way of a conductor 127 with branch conductors 126. These branch conductors 126 are connected respectively with the contactors 84 of the ramp rail controlled circuit making and breaking devices 73. This grounded partial circuit that is carried by the car and the partial circuit hereinbefore described that includes the ramp rail, the ramp battery and the corresponding track rail constitute what I term a holding and restoring circuit. Thus, it will be seen that as long as one of these coils 78' or 128 is energized, the current may flow through the electro-responsive device 35 in order to hold the brake applying mechanism against operation. From this it will be seen that as long as the devices 73 are normal the main circuit will be closed, thereby maintaining the device 35 energized so that the brake applying apparatus will remain inactive and the engineer have complete control of his train. As the train enters each block the shoe 79 rides upon the ramp rail R and elevates the rod 78, the ramp rails having inclined upper edges for this purpose, and in the upward movement of the rod 78 the main circuit is broken at the contact lugs 87 on the arms 88 incident to the rings 86 moving out of engagement with the lugs. However, if the controlling block is clear, the current from the ramp battery will flow through the ramp to the shoe 79 and thence through the rod 78, the contactor 84, branch conductor 126, conductor 127 and coil 128 of the relay 79′ back to the other side of the ramp battery through the ground 129 and rails, thereby holding the switch 134 closed so as to maintain the device 35 in normal condition. On the other hand, should the controlling block be occupied or a dangerous condition exist there, the ramp will be deenergized as previously described, and no current will flow through the holding circuit. Thus the train will be automatically stopped, unless the train is travelling at a speed below that at which the low speed governor is set, in which event the engineer having read his signal may proceed with caution below the minimum speed. This permissive movement of the train is brought about through the following agencies: One contact 118 of the low speed governor is connected by means of a conductor 202 in the main circuit between the reversing switch contact strip 97 and the battery 74′ and the other contact 118 of said governor is connected to the main circuit by a conductor 203 between the device 35 and the switch 134. In this conductor 203 is a manually operable normally open switch 204 which is arranged above a hand reset button 130 that is normally held in its lowered position under the action of gravity and with the assistance of a spring. When the hand reset button 130 is pressed upwardly by the engineer, it engages the blade of the switch 204 and closes such switch, so that current may flow from one side of the battery 74′ through a portion of the conductor 73′, the electro-responsive device 35, the switch 204, conductor 203, low speed governor contactor, conductor 202 and conductor 201, back to the other side of the battery by way of the conductor 140, assuming, of course, that the overload circuit breaker is in normal circuit closing position, as shown. Thus, the electro-responsive device 35 is maintained energized as long as the train is running below the minimum speed at which the minimum speed governor is set, so that the engineer is permitted to take his train slowly into the danger zone. Should the engineer attempt to run fast, then the low speed governor will operate automatically as previously described to break the established circuit, thereby bringing about an application of the brakes to stop the train.

By means of the maximum speed governor, should the engineer attempt to run his train above the speed at which said governor is set, the path for the current composed of conductor 73′ from one side of the battery 74′, conductor 133, switch 77′, coil 78′ and double coil solenoid connected in series with the switch 77′, conductor 200, maximum speed governor contacts, the particular branch conductor 81′, 82′ that extends through the active ramp rail control, circuit making and breaking device 73 to the particular conductor strip section 98, 99 that is bridged to the conductor strip 97 of the reversing switch, conductor 201 and the conductor 140 that is connected to the other side of the battery 74′, will be broken at the governor contacts 122, thereby deenergizing the lower coil 78′ of the double coil relay 79′ with the effect to permit both switches 77′ and 134 to drop to lower or open position, so that the main circuit through the switch 134 will be broken, thereby deenergizing the electro-responsive device 35, so that the brake applying mechanism will operate to bring about an application of the brakes to slow down the speed of the train. When the speed of the train is slowed down, within the limits of the maximum speed governor, the circuit just described will be closed at the governor contacts 122, but will remain open at the switch 77′ and the main circuit will remain open at the switch 134, thus compelling the train to slow down below the speed of the minimum speed governor. When the speed of the train has been reduced within the limits of the minimum speed governor, then the engineer may, by closing the switch 204, through the medium of the button 130, establish a path for the current through the device 35, thereby releasing the brakes so that the train may travel below the speed at which the minimum speed governor is set until the particular ramp controlled circuit making and breaking device contacts with an energized ramp rail. The current under these conditions flows from the battery 74′ through the conductor 73′ and the device 35 therein, the switch 204, conductor 203, the minimum speed governor contacts, conductor 202, conductor 201 and back to the other side of the battery 74′ by way of the conductor 140 to which the conductor 201 is connected at 141. When the active ramp controlled circuit making and breaking device 73 engages the next active ramp rail R, then the holding and restoring circuit is established, as previously described, and current flows through the coil 128 of the double coil solenoid 79', so as to restore the switches 77' and 134 to normal or running position, thereby permitting the speed of the train to be increased to normal.

The switch 204 is connected to the plunger or core of the solenoid 131, which is connected in series with a switch 132, the blade of the latter being also connected to the core or plunger of the solenoid 131. One contact of the switch 132 is tapped to the conductor 133, as at 205, while the other side of the winding of the solenoid 131 is connected to one of a pair of back contacts 206 for the blade of the switch 134, the other contact of the pair 206 being connected to the conductor 200 between the high speed governor contact and the coil 78'. As previously described, the blade of the switch 134 is connected to the plunger of the double coil solenoid 79' and when both coils of the latter are deenergized, as hereinbefore set forth, then the drop plunger or core of such solenoid 79' engages the blade of the switch 134 with the contacts 206, so that the engineer after pressing the reset button 130 to close the switch 204, will, by the same act, close the switch 132, thereby establishing a flow of current through the solenoid 131, such current flowing from the battery 74' through the conductor 73', conductor 133, switch 132, solenoid 131, switch blade 134 across the contacts 206, conductor 200, high speed governor contacts, the arms 88 of the particular device 73, the directional switch, conductor 201 and back to the other side of the battery by way of the conductor 140. Thus, the engineer may release the reset button 130 after closing the switches 204 and 132, so that the flow of current through the device 35 will be maintained by the switch 204 as long as the train is travelling below the speed at which the low speed governor is set.

A danger signal 135 has one side connected to the conductor 133 and the other side connected to one of a pair of back contacts 137 of the blade of the switch 77', the other contact of the pair 137 being connected to the conductor 140. Thus, when both coils of the solenoid 79' are deenergized and the blades of the switches 77' and 134 are in lowered position, the engineer will be notified of the condition of the apparatus by the energization of the danger signal 135. 76 indicates a running signal, one side of which is connected to the conductor 133 and the other side to the conductor 140. This running signal 76 is likewise energized as long as the apparatus is in running condition, but as soon as the coils of the relay 79' are deenergized, the flow of current through the running signal 76 is broken, so that the running signal is extinguished at the time that the danger signal is energized.

By means of the reversing or directional switch, one or the other of the devices 73 at either side of the train or car may be placed in service, according to whether the locomotive is running front end first or rear end first, or whether the car or train is operating over a line of trackway whereon trains are operated in both directions.

In the event that one of the rods 78 strikes an obstruction and breaks off the train line brake pressure will escape to the atmosphere through the hollow rod, thereby setting the brakes, but as long as the rods 78 remain intact the air pressure acts upon the piston heads 81, so as to maintain the shoes 79 in good electrical contact with the ramp rails when passing over same and return said rods to normal position after leaving the ramps.

In the present instance, I have shown a coiled expansion spring 142 surrounding each rod 78 of each ramp rail controlled circuit making and breaking device 73. This spring 142 acts to normally urge the piston 81 upwardly and the purpose of this spring is to elevate the rods 78, thereby breaking the circuit through the coil 78' and through the solenoid 131, so as to prevent the flow of current through any path through the device 35, in the event that the engineer releases the air from the train pipe of his locomotive when in the round house and neglects to restore the air to the train line before attempting to run out of the round house. Thus, by glancing at the shoes the engineer will be able to tell from the position thereof whether or not the air pressure has been restored in the train line brake pipe.

While I have herein shown and described a preferred embodiment of my invention by way of illustration, I wish it to be understood that I do not limit or confine myself to the precise details of construction herein described and delineated, as modifications and variations may be made within the scope of the claims and without departing from the spirit of the invention.

Having thus described the invention, what is claimed as new, is:—

1. In automatic train stopping apparatus, brake applying apparatus, a normally energized electro-responsive device holding said brake applying apparatus normally against operation, a main circuit including said electro-responsive device and a source of electrical energy, a switch in said circuit normally closed, a normally energized electro-responsive device holding said switch in normal position, circuit connections between said second named electro-responsive device and the source of energy, another electro-responsive device connected to said switch, a source of energy for said last named electro-responsive device, co-operating car carried and roadside elements operable under certain conditions of traffic to break the circuit connections of the second named electro-responsive device and establish circuit connections between the third named electro-responsive device and its source of energy, and safety means associated with each roadside element whereby the same will be rendered inactive to influence the circuit of said last named electro-responsive device in the event of displacement of any one of said roadside elements.

2. In automatic train stopping and speed controlling apparatus, brake applying apparatus, a normally energized electro-responsive device holding said brake applying apparatus normally against operation, a main circuit including said electro-responsive device and a source of electric energy, a switch in said circuit normally closed, a normally energized electro-responsive device holding said switch in normal position, circuit connections between said second-named electro-responsive device and the source of energy, another electro-responsive device connected to said switch, a source of energy for said last-named electro-responsive device, co-operating car-carried and roadside elements operable under certain conditions of traffic to break the circuit connections of the second-named electro-responsive device and establish circuit connection between the third-named electro-responsive device and its source of energy, safety means associated with each roadside element whereby the same will be rendered inactive to influence the circuit of said last named electro-responsive device in the event of displacement of any one of said roadside elements, and speed-control means electrically connected with the third electro-responsive device for relieving said normally energized electro-responsive device for holding the brake applying apparatus normally against operation, of the influence of said cooperating car-carried and roadside means when the speed of a train exceeds a predetermined maximum whereby said brake applying apparatus may be rendered active independently of the condition of said co-operating car-carried and roadside means.

3. In automatic train stopping and speed controlling apparatus, brake applying apparatus, a normally energized electro-responsive device holding said brake applying apparatus normally against operation, a main circuit including said electro-responsive device and a source of electric energy, a switch in said circuit normally closed, a normally energized electro-responsive device holding said switch in normal position, circuit connections between said second-named electro-responsive device and the source of energy, another electro-responsive device connected to said switch, a source of energy for said last-named electro-responsive device, co-operating car-carried and roadside elements operable under certain conditions of traffic to break the circuit connections of the second-named electro-responsive device and establish circuit connection between the third-named electro-responsive device and its source of energy, safety means associated with each roadside element whereby the same will be rendered inactive to influence the circuit of said last named electro-responsive device in the event of displacement of any one of said roadside elements, speed control means connected to the third electro-responsive device for relieving said normally energized electro-responsive device for holding the brake applying apparatus normally against operation, of the influence of said cooperating car-carried and roadside means when the speed of a train exceeds a predetermined maximum whereby said brake applying apparatus may be rendered active independently of the condition of said car-carried and roadside means, and speed control means for relieving said normally-energized electro-responsive holding device, of the influence of said car and roadside means when the speed of the train is below a predetermined minimum, whereby said device may be maintained in normal position irrespective of said car and roadside means.

4. In automatic train stopping and speed controlling apparatus, brake applying apparatus, a normally energized electro-responsive device holding said brake applying apparatus normally against operation, a main circuit including said electro-responsive device and a source of electric energy, a switch in said circuit normally closed, a normally energized electro-responsive device holding said switch in normal position, circuit connections between said second-named electro-responsive device and the source of energy, another electro-responsive device connected to said switch, a source of energy for said last-named electro-responsive device, co-operating car-carried and roadside elements operable under certain conditions of traffic to break the circuit connections of the second-named electro-responsive device and establish circuit connection between the third-named electro-responsive device and its source of energy, and speed-control means connected with the third electro-responsive device for relieving said normally energized electro-responsive device for holding the brake applying apparatus normally against operation, of the influence of said cooperating car-carried and roadside means when the speed of a train exceeds a predetermined maximum whereby said brake applying apparatus may be rendered active independently of the condition of said co-operating car-carried and roadside means.

5. In automatic train stopping and speed controlling apparatus, brake applying apparatus, a normally energized electro-responsive device holding said brake applying apparatus normally against operation, a main circuit including said electro-responsive device and a source of electric energy, a switch in said circuit normally closed, a normally energized electro-responsive device holding said switch in normal position, circuit connections between said second-named electro-responsive device and the source of energy, another electro-responsive device connected to said switch, a source of energy for said last-named electro-responsive device, co-operating car-carried and roadside elements operable under certain conditions of traffic to break the circuit connections of the second-named electro-responsive device and establish circuit connection between the third-named electro-responsive device and its source of energy, speed control means connected with the third electro-responsive device for relieving said normally energized electro-responsive device for holding the brake applying apparatus normally against operation, of the influence of said cooperating car-carried and roadside means when the speed of a train exceeds a predetermined maximum whereby said brake applying apparatus may be rendered active independently of the condition of said cooperating car-carried and roadside means, and speed control means for relieving said normally-energized electro-responsive holding device, of the influence of said car-carried and roadside means when the speed of the train is below a predetermined minimum, whereby said device may be maintained in normal position irrespective of said car and roadside means.

6. In automatic train stopping and speed controlling apparatus, brake applying apparatus, a normally energized electro-responsive device holding said brake applying apparatus normally against operation, a main circuit including said electro-responsive device and a source of electric energy, a switch in said circuit normally closed, a normally energized electro-responsive device holding said switch in normal position, circuit connections between said second-named electro-responsive device and the source of energy, another electro-responsive device connected to said switch, a source of energy for said last-named electro-responsive device, co-operating car-carried and roadside elements operable under certain conditions of traffic to break the circuit connections of the second-named electro-responsive device and establish circuit connection between the third-named electro-responsive device and its source of energy, a reversing switch and electric connections complementary thereto included in the car-carried means, a manually operable normally-open switch and electric connections complementary thereto for permissive movement of the train also included in the car-carried means, speed control means electrically connected with the third electro-responsive device for relieving said normally energized electro-responsive device for holding the brake applying apparatus normally against operation, of the influence of said cooperating car-carried and roadside means when the speed of a train exceeds a predetermined maximum whereby said brake applying apparatus may be rendered active independently of the condition of said cooperating car-carried and roadside means, and speed control means for relieving said normally energized electro-responsive holding device, of the influence of said car-carried and roadside means when the speed of the train is below a predetermined minimum, whereby said device may be maintained in normal position irrespective of said car-carried and roadside means.

In testimony whereof I have hereunto set my hand.

WALTER A. BROWNE.